US009296395B2

(12) United States Patent
Forcke et al.

(10) Patent No.: US 9,296,395 B2
(45) Date of Patent: Mar. 29, 2016

(54) COGNITIVE STATE SUPPORTED AUTOMOTIVE TRAVEL

(71) Applicant: International Business Machines Corporation, Armonk, NY (US)

(72) Inventors: Kember Anne-Rivers Forcke, Henrico, VA (US); Marc Kevin Johlic, Seminole, FL (US); Susann Marie Keohane, Austin, TX (US); Mary Jo Mueller, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 225 days.

(21) Appl. No.: 14/064,009

(22) Filed: Oct. 25, 2013

(65) Prior Publication Data

US 2015/0120081 A1    Apr. 30, 2015

(51) Int. Cl.
*B60W 40/08*    (2012.01)
*B60W 30/18*    (2012.01)

(52) U.S. Cl.
CPC ............. *B60W 40/08* (2013.01); *B60W 30/18* (2013.01); *B60W 2040/0818* (2013.01); *B60W 2040/0872* (2013.01)

(58) Field of Classification Search
CPC ................ B60W 40/08; B60W 2040/0872; B60W 2040/0818
See application file for complete search history.

(56) References Cited

U.S. PATENT DOCUMENTS

| | | | |
|---|---|---|---|
| 5,465,079 A * | 11/1995 | Bouchard et al. | 340/576 |
| 5,942,979 A * | 8/1999 | Luppino | 340/576 |
| 6,580,973 B2 | 6/2003 | Leivian et al. | |
| 7,042,345 B2 | 5/2006 | Ellis | |
| 7,468,673 B2 | 12/2008 | Sultan et al. | |
| 7,535,344 B2 | 5/2009 | Obradovich | |
| 2007/0027406 A1 | 2/2007 | LaPlaca et al. | |
| 2008/0215202 A1 | 9/2008 | Breed | |
| 2011/0304465 A1 * | 12/2011 | Boult et al. | 340/576 |
| 2012/0190001 A1 * | 7/2012 | Knight et al. | 434/362 |
| 2013/0179472 A1 | 7/2013 | Junqua et al. | |

OTHER PUBLICATIONS

Bruce, Doctors could be held responsible for patients driving with cognitive impairments, http://www.earthtimes.org/health/doctors-held-responsible-patients-driving-cognitive-impairments/536/, Mar. 21, 2011 8:49:0 GMT.

(Continued)

*Primary Examiner* — Mussa A Shaawat
*Assistant Examiner* — Abdhesh Jha
(74) *Attorney, Agent, or Firm* — Garg Law Firm, PLLC; Rakesh Garg; William J. Stock

(57) ABSTRACT

A method, system, and computer program product for cognitive state supported automotive travel are provided in the illustrative embodiments. A detection is made that an event in a vehicle is outside of acceptable bounds for that event. A determination is made whether the event being outside of acceptable bounds is a result of a cognitive state of a person operating the vehicle. Responsive to the event being a result of the cognitive state of the person, an indication of the cognitive state of the person being below a threshold level of cognitive abilities is generated. An action corresponding to the cognitive state is performed. The action causes the vehicle to operate with improved safety.

20 Claims, 6 Drawing Sheets

(56) References Cited

OTHER PUBLICATIONS

Carr et al; Older Adult Drivers with Cognitive Impairment, http://www.schindlermd.com/elderdriving.pdf, Mar. 15, 2006, American Family Physician, www.aafp.org/afp, vol. 73, No. 6, 1029-1034.
The Introduction of a New Screening Tool for the Identification of Cognitively Impaired Medically At-Risk Drivers : The SIMARD A Modification of the DemTect, Journal of Primary Care & Community Health, http://jpc.sagepub.com/content/1/2/119.full.pdf+html?ijkey=4CCEVM5wPAVBw&keytype=ref&siteid=spjpc.
Tutoru, Smart Cars for Elderly Drivers, http://www.prescouter.com/2012/05/smart-cars-for-elderly-drivers/, May 8, 2012.
Hadhazy, Google's Driverless Cars Point to 'Smart' Vehicles of the Future, http://www.technewsdaily.com/1354-googles-driverless-cars-point-to-smart-vehicles-of-the-future-.html.Oct. 14, 2010 01:30 pm ET.
Doty, Driving and Progressing Dementia, alzonline.phhp.ufl.edu/en/reading/DrivingADArticleAlzOnlineSess2.pdf.
Welsh et al; Experts say Ontario is failing to weed out at -risk drivers over 80, www.thestar.com/news/canada/article/1129436--experts-say-ontario-is-failing-to-weed-out-at-risk-drivers-over-80, Toronto Star,Published on Sun Feb. 12, 2012.

* cited by examiner

COGNITIVE STATE SUPPORTED AUTOMOTIVE TRAVEL

TECHNICAL FIELD

The present invention relates generally to a method, system, and computer program product for improving safety of automotive travel. More particularly, the present invention relates to a method, system, and computer program product for cognitive state supported automotive travel.

BACKGROUND

The mental abilities of a user of a vehicle, such as of a driver of an automobile, is an important factor in the safety of automotive travel. Particularly, the state of mind, or the cognitive state, of the user plays an important role in the safety of the user and others while the user operates the vehicle.

Persons suffering from mental illnesses, suffering from illnesses having adverse mental or cognitive consequences, operating under stress, operating under the influence of medication or toxins, or afflicted with age related decline of mental capabilities are some examples of individuals with diminished cognitive abilities. While operating a vehicle is prohibited for persons suffering from some types of diminished cognitive abilities, individuals with other types of diminished cognitive abilities can and do legally operate vehicles for their day-to-day needs.

SUMMARY

The illustrative embodiments provide a method, system, and computer program product for cognitive state supported automotive travel. An embodiment includes a method for cognitive state supported automotive travel. The embodiment detects that an event in a vehicle is outside of acceptable bounds for that event. The embodiment determines whether the event being outside of acceptable bounds is a result of a cognitive state of a person operating the vehicle. The embodiment generates, responsive to the event being a result of the cognitive state of the person, an indication of the cognitive state of the person being below a threshold level of cognitive abilities. The embodiment performs an action corresponding to the cognitive state, wherein the action causes the vehicle to operate with improved safety.

Another embodiment includes a computer usable program product comprising a computer usable storage device including computer usable code for cognitive state supported automotive travel. The embodiment further includes computer usable code for detecting that an event in a vehicle is outside of acceptable bounds for that event. The embodiment further includes computer usable code for determining whether the event being outside of acceptable bounds is a result of a cognitive state of a person operating the vehicle. The embodiment further includes computer usable code for generating, responsive to the event being a result of the cognitive state of the person, an indication of the cognitive state of the person being below a threshold level of cognitive abilities. The embodiment further includes computer usable code for performing an action corresponding to the cognitive state, wherein the action causes the vehicle to operate with improved safety.

Another embodiment includes a data processing system for cognitive state supported automotive travel. The embodiment further includes a storage device including a storage medium, wherein the storage device stores computer usable program code. The embodiment further includes a processor, wherein the processor executes the computer usable program code. The embodiment further includes computer usable code for detecting that an event in a vehicle is outside of acceptable bounds for that event. The embodiment further includes computer usable code for determining whether the event being outside of acceptable bounds is a result of a cognitive state of a person operating the vehicle. The embodiment further includes computer usable code for generating, responsive to the event being a result of the cognitive state of the person, an indication of the cognitive state of the person being below a threshold level of cognitive abilities. The embodiment further includes computer usable code for performing an action corresponding to the cognitive state, wherein the action causes the vehicle to operate with improved safety.

BRIEF DESCRIPTION OF THE SEVERAL VIEWS OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
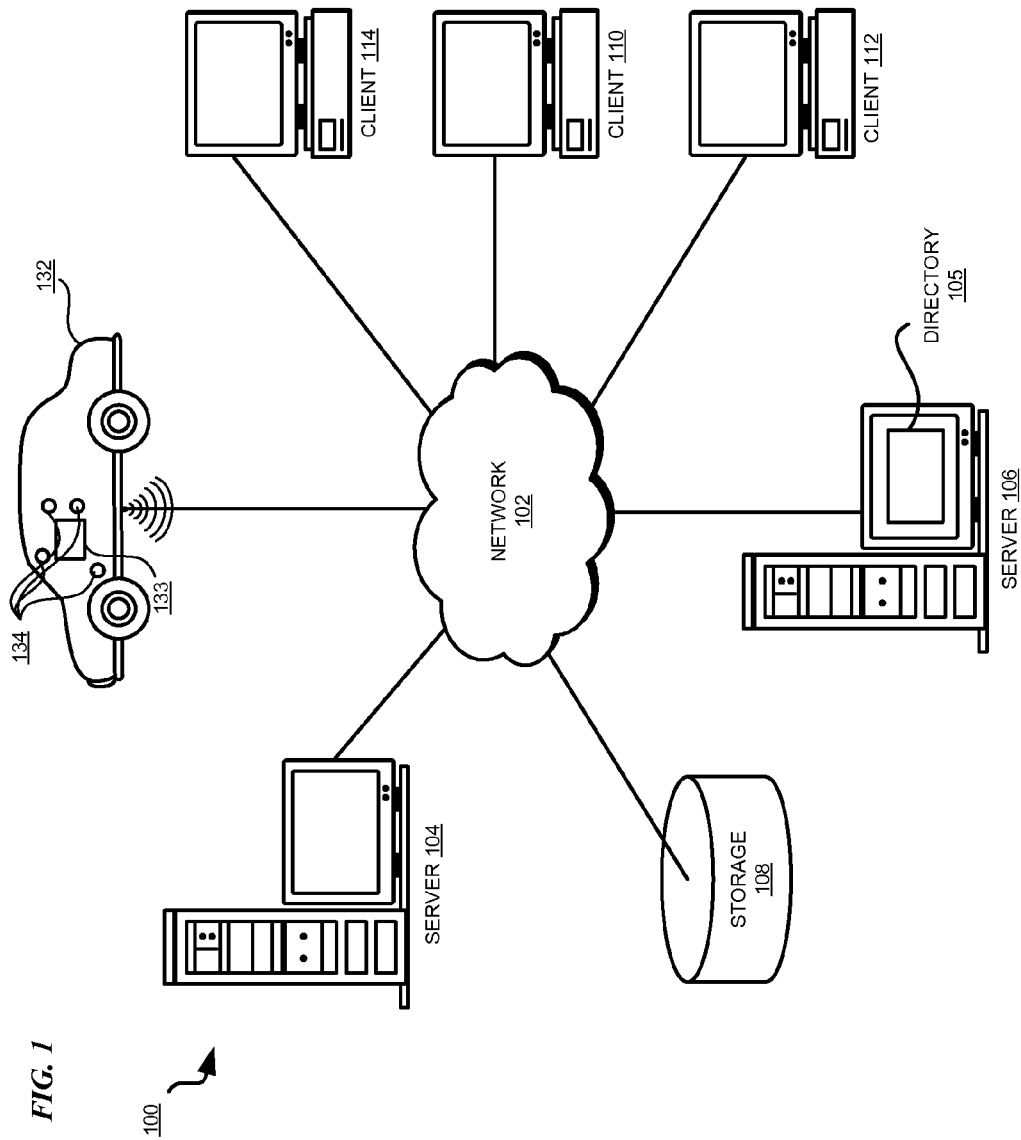
FIG. 1 depicts a block diagram of a network of data processing systems in which illustrative embodiments may be implemented.

A threshold level of cognitive abilities is the cognitive abilities of a healthy person of comparable age, operating a comparable vehicle under comparable operating conditions. Some users experience less than the threshold level of cognitive abilities, to wit, below-threshold cognitive state, due to age or disease.

Presently, persons with certain categories of diminished cognitive abilities experience a greater risk in operating a vehicle as compared to persons with at least the threshold level of cognitive abilities. For example, a person suffering from Alzheimer's disease tend to take longer to mentally process information, or becomes more forgetful as compared to a healthy person, increasing their chances of getting lost or causing an accident while operating a vehicle.

The illustrative embodiments recognize that delayed responses, incorrect responses to known situations, forgetting a goal or objective, and forgetting or incorrectly remembering a task or a location are some example consequences of being in a below-threshold cognitive state. The illustrative embodiments further recognize that visible or biological expression of stress, pattern of responses in an interrogation, series of decisions, and other such indicators are usable for determining the cognitive state of an individual.

The illustrative embodiments also recognize that a person's cognitive state can change with time and other factors, such as stress inducers. The illustrative embodiments recognize that operating a vehicle should be safe for persons in below-threshold cognitive state, and for those around such persons.

The illustrative embodiments recognize that effectively and timely detecting a person's cognitive state is important in ensuring such safety. The illustrative embodiments further recognize that adjusting the operation of the vehicle upon detection of a below threshold cognitive state of the operator is useful in improving the safety of the vehicle's operation.

The illustrative embodiments used to describe the invention generally address and solve the above-described problems and other problems related to safety of automotive travel. The illustrative embodiments provide a method, system, and computer program product for cognitive state supported automotive travel.

An embodiment collects or receives information from biometric sensors, inputs from data processing systems operating in a vehicle or accessible over a data network, inputs from a person operating the vehicle, or a combination thereof. Using these inputs, the embodiment determines whether the person's cognitive state is suitable for operating the vehicle.

An embodiment continuously monitors the person's cognitive state during the operation of the vehicle. Another embodiment detects an indicator of below-threshold cognitive state during the operation of the vehicle and begins monitoring the person's cognitive state.

An embodiment validates a determined cognitive state of the person. Once the embodiment establishes that the person is operating in a below-threshold cognitive state, one embodiment executes operations to increase the safety of the vehicle's operation under the below-threshold cognitive state. For example, the embodiment causes an adjustment or change in a system associated with the vehicle to perform an operation that is safer than the operation performed by the user.

Another embodiment presents the established cognitive state to another data processing system for further processing or action. Another embodiment sends a command or a message to a system in the vehicle, another data processing system over a network, the person operating under below-threshold cognitive state, or another designated person, any of which can then take appropriate actions to increase the safety of the vehicle's operation.

An embodiment further integrates with smart home systems to assist the person in operating the vehicle safely. For example, the embodiment can determine whether the person is suitably equipped with medicines, devices, and other necessities prior to beginning the operation of the vehicle. If the person is lacking a necessary object, the embodiment, through integration with a smart home system can help the person locate or obtain the object. As another example, the embodiment can communicate with home automation system to determine a purpose, goal, or objective of a trip. The embodiment can then determine a safe operation to accomplish those goals or objectives according to the person's cognitive state.

The illustrative embodiments are described with respect to certain operations, actions, inputs, outputs, devices, data processing systems, environments, components, and applications only as examples. Any specific manifestations of such artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
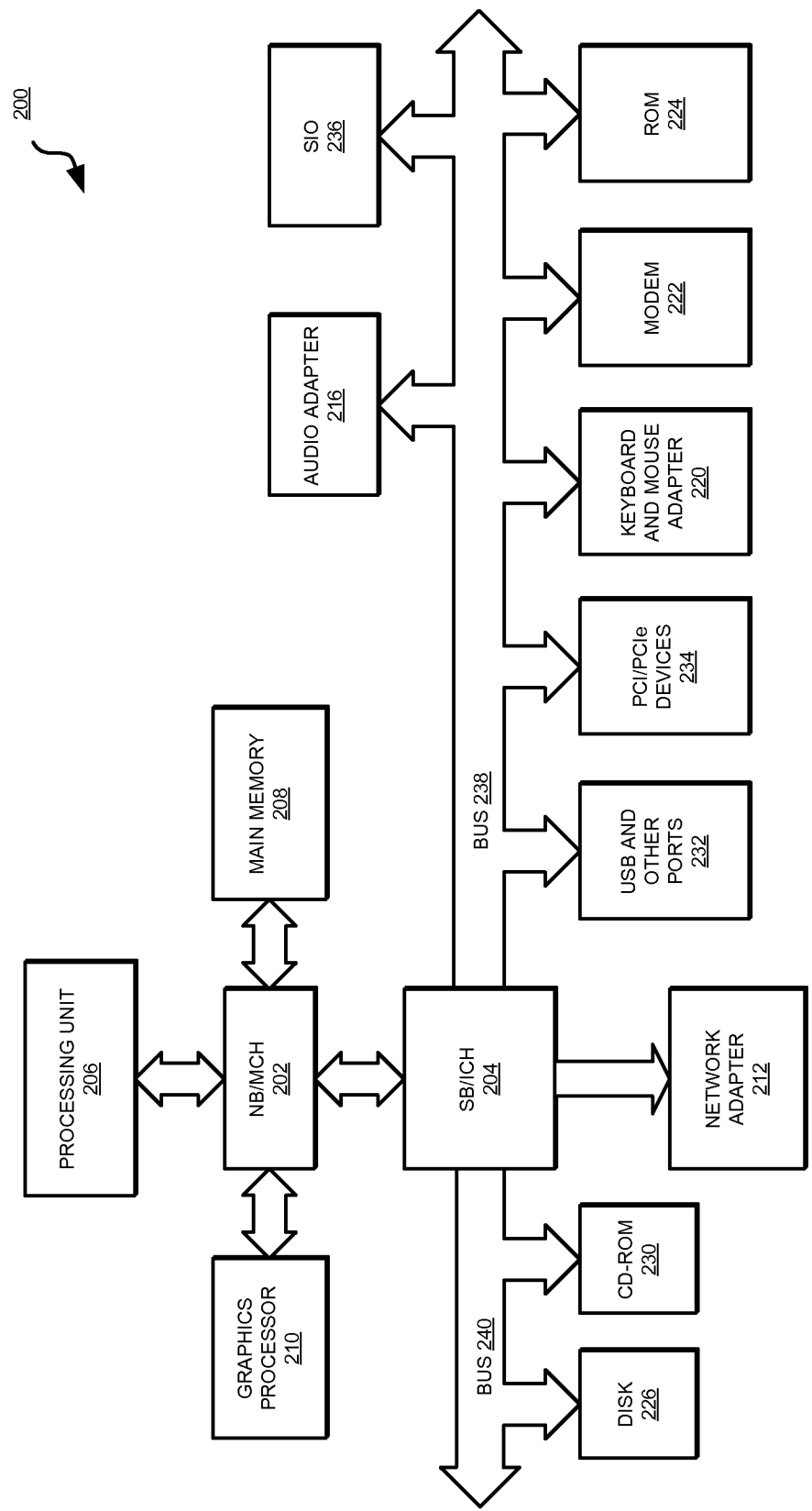
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables. Server 104 and server 106 couple to network 102 along with storage unit 108. Software applications may execute on any computer in data processing environment 100.

In addition, clients 110, 112, and 114 couple to network 102. A data processing system, such as server 104 or 106, or client 110, 112, or 114 may contain data and may have software applications or software tools executing thereon.

Only as an example, and without implying any limitation to such architecture, FIG. 1 depicts certain components that are useable in an embodiment. Vehicle 132 is depicted as a car only as an example, and not as a limitation on the illustrative embodiments. Any vehicle of any type may be improved with an embodiment described herein. Vehicle 132 communicates with network 102 using some form of wireless communication. Application 133 executes in vehicle 132, such as in an onboard data processing system (not shown) implemented within vehicle 132, or in conjunction with such onboard system. Sensors 134 are one or more sensors to collect biometric and other information from the person operating vehicle 132 to use in determining the person's cognitive state. For example, sensors 134 include but are not limited to biometric sensors for checking the pulse, blood pressure, pupil movements, sweat, body movements, and other biometric functions of the person. Sensors 134 can also include microphones, speakers, and tactile transducers for application 133 to communicate with the person. Application 133 is configured to send and receive data from the onboard system of vehicle 132, and to or from other systems operating in conjunction with vehicle 132, such as a navigation system in vehicle 132.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications.

With reference to FIG. 2, this figure depicts a block diagram of a data processing system in which illustrative embodiments may be implemented. Data processing system 200 is an example of a computer, such as server 104 or client 110 in FIG. 1, or another type of device in which computer usable program code or instructions implementing the processes may be located for the illustrative embodiments. Data processing system 200 is also representative of an onboard system, such as a device on which application 133 of FIG. 1 executes in vehicle 132 in FIG. 1. Computer usable program code or instructions implementing the processes of the illustrative embodiments may be located on such onboard system or device. Data processing system 200 is also representative of an embedded, removable, or mobile computing device, such as an example implementation of a communication device, navigation device, or a combination thereof, that can be associated with automobile 132 to execute application 133 in FIG. 1, in which computer usable program code or instructions implementing the processes of the illustrative embodiments may be located. Data processing system 200 is described as a computer only as an example, without being limited thereto. Implementations in the form of onboard system in vehicle 132, or a mobile or removable device containing instructions of all or part of application 133 in FIG. 1 may modify data processing system 200 and even eliminate certain depicted components there from without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system such as AIX® (AIX is a trademark of International Business Machines Corporation in the United States and other countries), Microsoft® Windows® (Microsoft and Windows are trademarks of Microsoft Corporation in the United States and other countries), or Linux® (Linux is a trademark of Linus Torvalds in the United States and other countries). An object oriented programming system, such as the Java™ programming system, may run in conjunction with the operating system and provides calls to the operating system from Java™ programs or applications executing on data processing system 200 (Java and all Java-based trademarks and logos are trademarks or registered trademarks of Oracle Corporation and/or its affiliates).

Instructions for the operating system, the object-oriented programming system, and applications or programs, such as application 105 in FIG. 1, are located on storage devices, such as hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a PDA.

Figure 3:
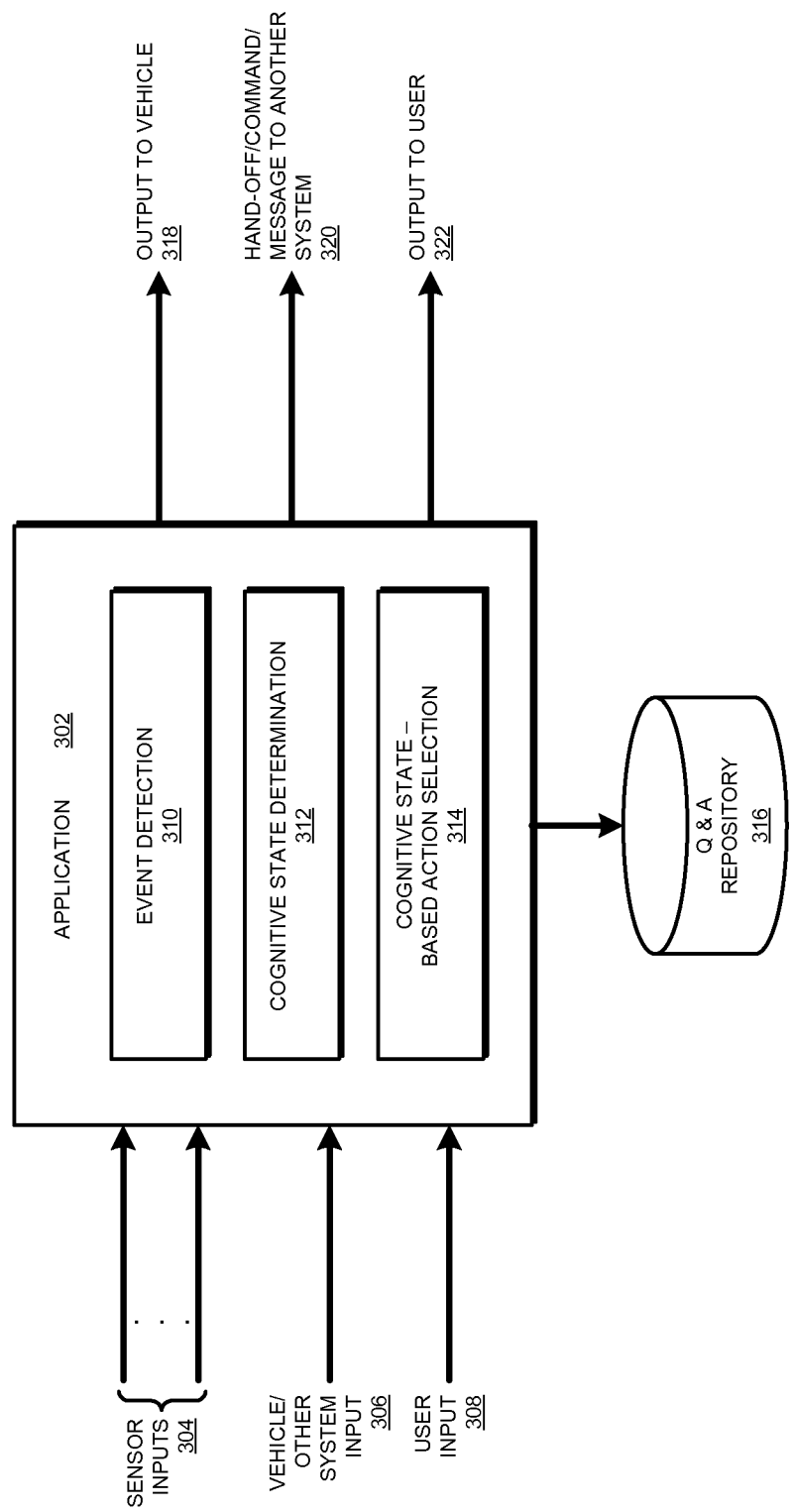
FIG. 3 depicts a block diagram of a configuration for cognitive state supported automotive travel in accordance with an illustrative embodiment.

With reference to FIG. 3, this figure depicts a block diagram of a configuration for cognitive state supported automotive travel in accordance with an illustrative embodiment. Application 302 is an example of application 133 in FIG. 1.

Application 302 receives inputs 304 from one or more sensors installed in a vehicle, such as sensors 134 in vehicle 132 in FIG. 1. Application 302 further receives inputs 306 from data processing systems installed onboard a vehicle or operating within the vehicle. Application 302 also receives one or more inputs 308 provided by a user—the person operating the vehicle. At any given time, application 302 is configured to receive some or all depicted inputs, and application 302 operates as described herein using the available inputs.

Event detection component 310 of application 302 detects an event using a combination of inputs 304, 306, and 308. Particularly, component 310 detects an event that is indicative of a cognitive state or a change in the cognitive state of the person operating the vehicle. For example, at a given time, the person's pulse or blood pressure detected by a biometric sensor on a steering wheel or gear shifter of the vehicle, agitation or body heat detected by a biometric sensor in the seat of the vehicle, a facial expression observed by another sensor in the vehicle, or a combination thereof, are forms of input 304. Component 310 further detects that the person has turned the vehicle On via input 306 received from a system in the vehicle.

Input 304 and 306, alone or together in the above example present an event to component 310 that indicates that application 302 should determine the person's cognitive state. Accordingly, cognitive state determination component 312 operates to establish the cognitive state of the person. For example, in one embodiment, component 312 offers a series of challenge questions to the person. The person's responses are received as input 308.

In one embodiment, component 312 takes the form of an artificially intelligent expert system. The questions and answers are present in repository 316, which the expert system uses to establish the cognitive state of the person. For example, when component 312 presents a question, such as in an audio form, component 312 considers the substantive answer of the question along with tonal, temporal, and other qualities of the answer. For example, the person may answer a question correctly but where repository 316 indicates that the person usually takes one second to answer that question correctly, in the present instance the person has taken three seconds to answer the question. Substantively, the person's answer may be correct, but qualitatively, the prolonged response time may be an indicator of below-threshold cognitive state.

As another example, component 312 may ask another question to which the person usually answers correctly, but in the present instance gets the answer wrong. An incorrect substantive answer is also an indicator of below-threshold cognitive state in some cases. Component 312 uses such substantive and qualitative analyses of the challenge questions and answers to supplement or reinforce the determination of the person's cognitive state.

In one embodiment, when the indicators of cognitive state extracted from inputs 304, 306, and 308, and cognitive state conclusions drawn from the indicators collected by component 312 exceed a limit, component 312 associates a cognitive state with the person at that given time with greater than a threshold degree of confidence. For example, in one implementation, component 312 determines that the limit is reached or passed when two biometric sensor readings are beyond acceptable limits for those measurements, and the person answers at least three questions with dissatisfactory qualitative or substantive answers. Accordingly, in such an example implementation, component 312 determines, with an above threshold degree of confidence, that the person is performing in below-threshold cognitive state at that time.

Under certain circumstances, such as during a momentary lapse of thought processing or at the onset of a longer term symptoms of an illness, the person operating the vehicle may talk or ask questions that indicate a change in the person's cognitive state. For example, while driving, the person may inquire where the person is presently located. Component 310 detects that inquiry as an event that is an indicator of a change in the person's cognitive state. An embodiment uses the person's asking, "Where am I?" as an indicator of changing cognitive state for a variety of reasons.

For example, an embodiment extracts a qualitative indicator from this question by the fact that the person's travel history shows that the person has been at the present location many times before and should not be asking this question. Another qualitative indicator may be that the voice quality, tone, or timber when the question is asked may be different from previously sensed voice quality, tone, or timber. Another qualitative indicator may be that the question is in a series of miscalculations, wrong actions, or other questions from the person.

In one embodiment, component 312 then begins monitoring the person, such as via the sensors or by questions and answers, for additional indicators to establish the person's cognitive state. In another embodiment, component 312 changes the ongoing monitoring of the person, such as by selecting different challenge questions, or seeking biometric data from different or additional sensors.

The questions, the analyses, the inputs, the thresholds, and the criteria for confidence are all described as examples for the clarity of the description and not as limitations on the illustrative embodiments. Those of ordinary skill in the art will be able to conceive from this disclosure many other questions, analyses, inputs, thresholds, and criteria for similar determination of cognitive state of a person, and the same are contemplated within the scope of the illustrative embodiments.

Cognitive state based action selection component 314 receives the cognitive state established by component 312. If the person's cognitive state is below a threshold cognitive state, component 314 determines an action to perform in view of the below-threshold cognitive state that would improve the safety of the vehicle's operation by the person at that time. For example, input 306 may indicate that the vehicle is moving at a certain speed, towards a certain destination, along a certain route. An example action selected by component 314 in response to a below-threshold cognitive state may be to change the vehicle's speed to a lower speed, compute an alternate route to the same destination, redirect the vehicle to a different safer destination, or a combination thereof.

Another possible action selected by component 314 may be to inform a care provider, such as the person's doctor, a medic, a nurse, or a psychologist. Such information may enable the person to receive counseling to stop, slow down, or go to a safer location. Another possible action selected by component 314 may be to inform a service provider, such as a navigation operator, a vehicle guidance operator, or a law enforcement officer. Such information could enable the service provider to disable the vehicle or prepare to block the vehicle and route the vehicle to a safer location.

In one embodiment, component 314 references a preprogrammed list of actions to select the action in response to a below-threshold cognitive state of the person. Another embodiment allows the person or another user or system to program or reprogram a list of possible actions and their configurations, such as phone numbers, text messages, protocol to use, port to send a call on, and other such configurations.

The action selected by component 314 results in one or more outputs. For example, application 302 may generate output 318, which may be a message or command to the vehicle's onboard system. As another example, application 302 may generate output 320, which may be a message or command to another data processing system, which may be located in the vehicle or accessible from the vehicle over a network. As another example, application 302 may generate output 322, which may be a message or instruction to the person operating the vehicle, such as via an audible sound, visible text, or tactile feedback. An embodiment can generate a combination of outputs 318, 320, and 322 as well.

Figure 4:
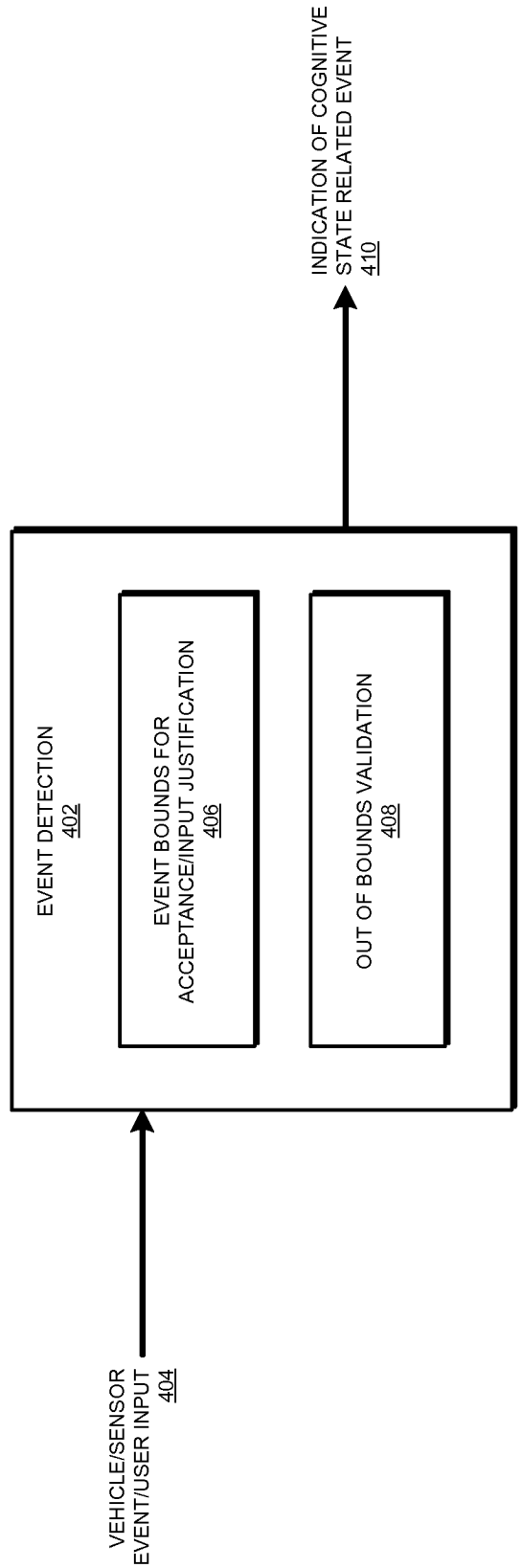
FIG. 4 depicts a block diagram of an event detection component in accordance with an illustrative embodiment.

With reference to FIG. 4, this figure depicts a block diagram of an event detection component in accordance with an illustrative embodiment. Even detection component 402 is an example of component 310 in FIG. 3.

Component 402 receives sensor inputs 404. In one embodiment, component 402 may also receive inputs from vehicle systems, and systems operating in the vehicle environment. In one embodiment, component 402 also receives an input from a user, such as a question or an inquiry described in an example earlier.

Sub-component 406 identifies an event that corresponds to the particular combination of inputs 404. Sub-component 406 further determines whether an input in inputs 404 is justified according to the circumstances, to wit, whether the event is within the acceptable bounds. For example, when the person inquires about the person's present location, the event may be justified, or be within acceptance bounds of the event, if the present location is a new location. However, the same event may not be justified, or may not be within acceptance bounds, if the present location has been visited several times in the near history of vehicle operation by the same person.

A combination of inputs 404 can be tested for acceptance bounds or justification in a similar manner. Determining whether an input is justified or an event is within the event's acceptance bounds establishes whether an event in the vehicle environment should be analyzed further.

Sub-component 408 performs further validation of the event if the event has to be analyzed further. For example, when the person asks, "Where am I?" at a previously visited location, and subsequently states "oh! I know", the person may have experienced a momentary lapse in the thought process, such as due to distraction, and not due to a change in the person's cognitive state.

Conversely, if the person was driving home, asks, "where am I?" and keeps on driving to exit a defined perimeter, exiting the perimeter (e.g., an input from a navigation system) is further justification that the event is probably cognitive state related. Thus, even if the combination of inputs gives rise to an event worth investigating from sub-component 406, further justification by sub-component 408 may result in the event being discarded as unrelated to cognitive state or may result in the event being reinforced as resulting from cognitive state.

Sub-component 408 tests the event for further out of bounds justifications, such as by correlating other inputs (not shown), or relying on an historical analysis of similar combination of inputs. Sub-component 408 either produces a result indicating that an event is out of bounds and related to cognitive state, or a result indicating that the event is not related to the person's cognitive state. If the event is related to the person's cognitive state, component 402 outputs 410 indication of the presence of a cognitive state related event.

Figure 5:
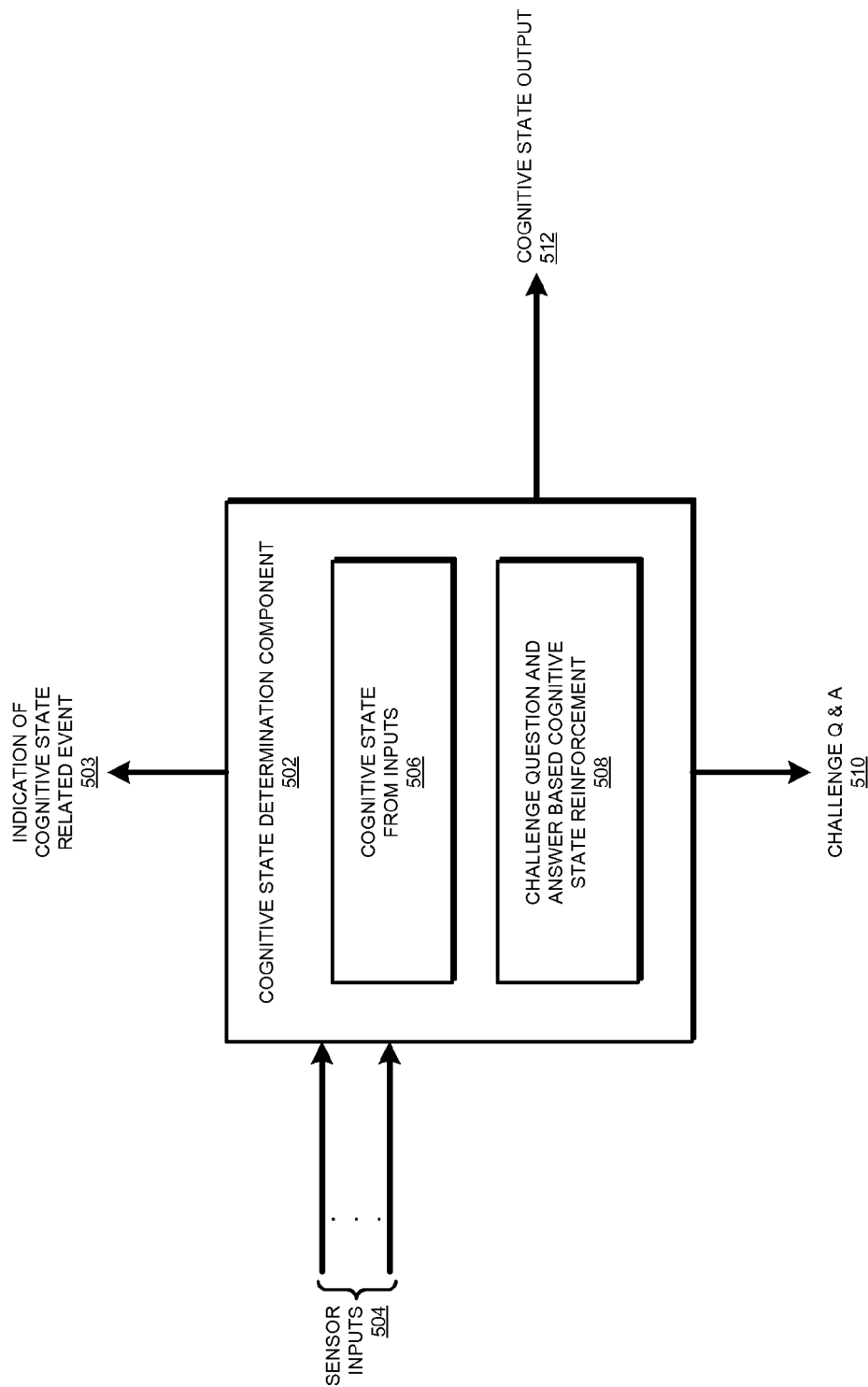
FIG. 5 depicts a block diagram of a cognitive state determination component in accordance with an illustrative embodiment.

With reference to FIG. 5, this figure depicts a block diagram of a cognitive state determination component in accordance with an illustrative embodiment. Component 502 is an example of component 312 in FIG. 3.

In order to determine the cognitive state of the person operating the vehicle, component 502 receives indication 503 of cognitive state related event and sensor inputs 504. In one embodiment, component 502 may also receive inputs from vehicle systems.

Indication 503 is an example of indication 410 in FIG. 4, and informs component 502 that an even has occurred in the vehicle environment that appears to be related to the cognitive state of the person operating the vehicle. Sub-component 506 makes further determinations about the person's cognitive state by using inputs 504. The determination in sub-component 506 is a preliminary determination. For example, a biometric sensor may indicate elevated pulse, which may be an indicator of changed cognitive state, or may be a result of a brisk walk to the vehicle. Sub-component 506 only establishes that some inputs are indicators of the person's cognitive state or changing cognitive state.

Sub-component 508 reinforces the preliminary finding of cognitive state or a change therein. For example, in one embodiment, sub-component 508 includes an expert system that selects a line of challenge questions from a repository, such as repository 316 in FIG. 3. Sub-component 508 reinforces or rejects the preliminary determination of sub-component 506 by exchanging (510) the questions and answers with the person.

Sub-component 508 establishes a cognitive state of the person with greater certainty than the preliminary determination of sub-component 506. Component 502 outputs the established cognitive state as output 512. In one embodiment, sub-component 508 also assigns a confidence rating to the established cognitive state of the person. In such an embodiment, output 512 also includes a level of confidence in the established cognitive state.

Figure 6:
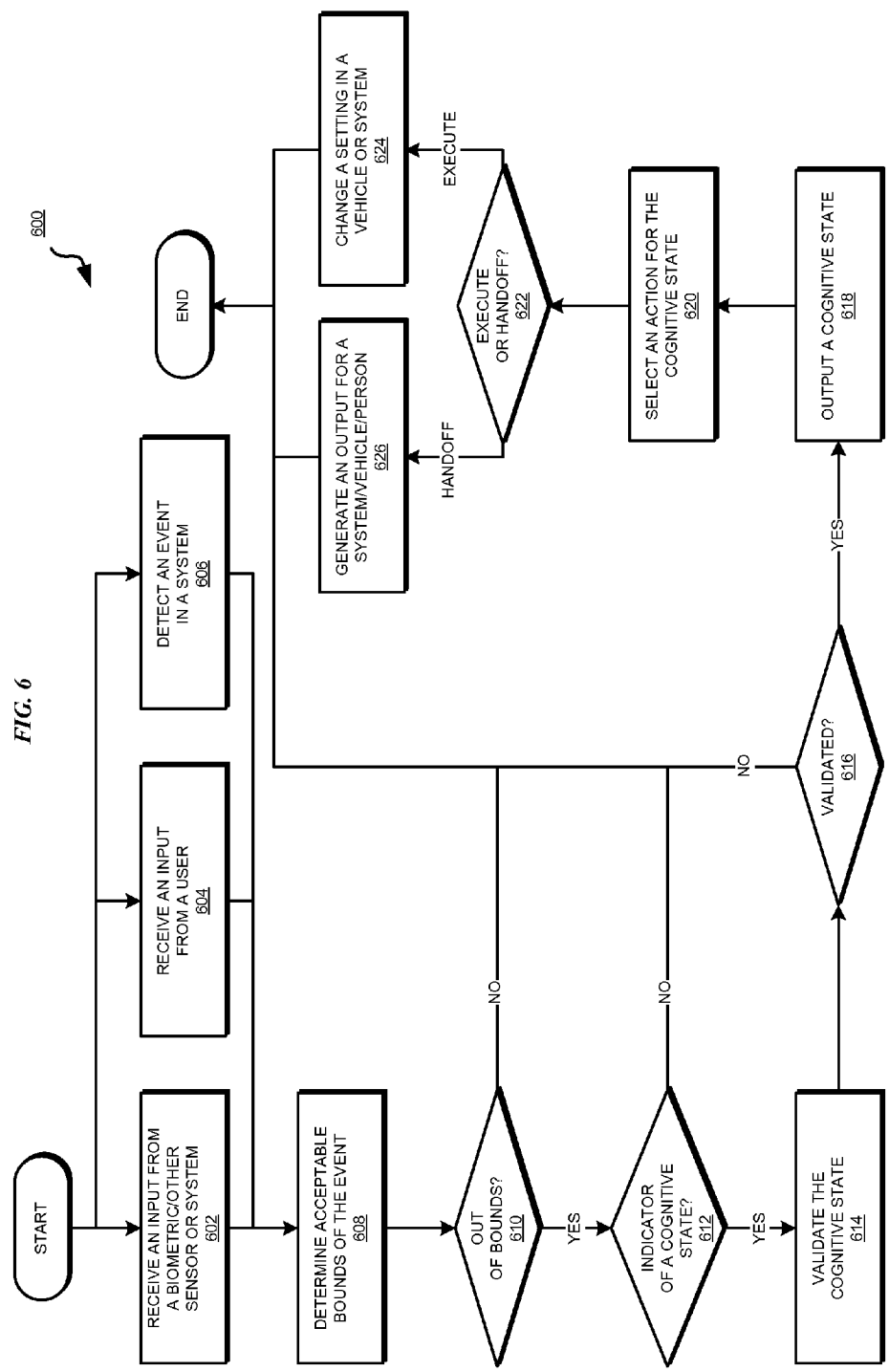
FIG. 6 depicts a flowchart of an example process of cognitive state supported automotive travel in accordance with an illustrative embodiment.

With reference to FIG. 6, this figure depicts a flowchart of an example process of cognitive state supported automotive travel in accordance with an illustrative embodiment. Process 600 can be implemented in application 302 in FIG. 3.

The application receives a combination of some or all information in blocks 602, 604, and 606. For example, the application receives input data from biometric or other sensors, onboard or other systems in the vehicle environment (block 602). The application receives an input from a user—the person operating the vehicle (block 604). The application otherwise detects an event in the vehicle environment (block 606).

The application determines the acceptable boundaries of the events (block 608). The event is deemed not related to cognitive state if the event is within the defined boundaries, otherwise deemed related to the cognitive state of the person operating the vehicle. Accordingly, the application determines whether the event parameters are outside of the acceptable bounds (block 610).

If the event parameters are within the acceptable bounds ("No" path of block 610), the application ends process 600 thereafter. If the event parameters are outside the acceptable bounds ("Yes" path of block 610), the application determines whether the event is an indicator of a cognitive state of the person (block 612).

If the event is not an indicator of a cognitive state of the person ("No" path of block 612), the application ends process 600 thereafter. If the event is an indicator of a cognitive state of the person ("Yes" path of block 612), the application optionally validates the cognitive state (block 614).

For example, in one embodiment the application may attempt to distinguish between different cognitive states that could produce similar events, and only one or some of the different cognitive states would warrant intervention by the application. If a cognitive state requires intervention by the application, the cognitive state is deemed to be validated, otherwise not.

The application determines if the cognitive state related to the event is validated (block 616). If the cognitive state related to the event is not validated ("No" path of block 616), the application ends process 600 thereafter. If the cognitive state related to the event is validated ("Yes" path of block 616), the application outputs a cognitive state of the person (block 618).

The application selects an action to perform in response to the cognitive state (block 620). The application determines whether the selected action can be executed, or has to be handed off to another system or individual for execution (block 622). For example, if the example action is to provide verbal instructions to the person operating the vehicle, the application can execute the action. However, if the action is to notify someone about leaving a perimeter or causing the vehicle to be disabled, the application hands-off the action to another existing system capable of performing that action, such as by sending a command to such existing system.

If the application can execute the action ("Execute" path of block 622), the application changes a setting in the vehicle or a system, such as by activating an audio system, sending a reduce speed instruction to the vehicle's onboard system, and the like (block 624). The application ends process 600 thereafter. If the application has to hand-off the action ("Handoff" path of block 622), the application generates an output for an onboard system, another data processing system, or an individual, such as by sending a message to such systems or individuals (block 626). The application ends process 600 thereafter.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Thus, a computer implemented method, system, and computer program product are provided in the illustrative embodiments for cognitive state supported automotive travel. Additional enhancements to the embodiments described herein are possible and contemplated within the scope of the illustrative embodiments.

For example, an embodiment can be configured to learn from the events occurring over a period such that the embodiment refines or customizes itself to the user. As an example, an embodiment can establish causal relationships for certain events, such as by identifying circumstances that trigger certain events. For example, an embodiment can determine that a specific cognitive state related event mostly occurs near a school zone, during drop off/pick up times, or in heavier than a threshold level of traffic. An example implementation of an embodiment can learn and analyze when or where an event happens, to determine if there is a pattern to why the event occurs or what triggers the event. An embodiment can be further configured to adjust "normal" bounds depending on the external environment such as traffic, school zone, specific times, etc., that causes heighten awareness or nervousness in the user.

As will be appreciated by one skilled in the art, aspects of the present invention may be embodied as a system, method, or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable storage device(s) or computer readable media having computer readable program code embodied thereon.

Any combination of one or more computer readable storage device(s) or computer readable media may be utilized. The computer readable medium may be a computer readable storage medium. A computer readable storage device may be, for example, but not limited to, an electronic, magnetic, optical, electromagnetic, or semiconductor system, apparatus, or device, or any suitable combination of the foregoing. More specific examples (a non-exhaustive list) of the computer readable storage device would include the following: a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage device may be any tangible device or medium that can store a program for use by or in connection with an instruction execution system, apparatus, or device. The term "computer readable storage device," or variations thereof, does not encompass a signal propagation media such as a copper cable, optical fiber or wireless transmission media.

Program code embodied on a computer readable storage device or computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to one or more processors of one or more general purpose computers, special purpose computers, or other programmable data processing apparatuses to produce a machine, such that the instructions, which execute via the one or more processors of the computers or other programmable data processing apparatuses, create means for implementing the functions/acts specified in the flowchart and/or block diagram block or blocks.

These computer program instructions may also be stored in one or more computer readable storage devices or computer readable media that can direct one or more computers, one or more other programmable data processing apparatuses, or one or more other devices to function in a particular manner, such that the instructions stored in the one or more computer readable storage devices or computer readable medium produce an article of manufacture including instructions which implement the function/act specified in the flowchart and/or block diagram block or blocks.

The computer program instructions may also be loaded onto one or more computers, one or more other programmable data processing apparatuses, or one or more other devices to cause a series of operational steps to be performed on the one or more computers, one or more other programmable data processing apparatuses, or one or more other devices to produce a computer implemented process such that the instructions which execute on the one or more computers, one or more other programmable data processing apparatuses, or one or more other devices provide processes for implementing the functions/acts specified in the flowchart and/or block diagram block or blocks.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A method for cognitive state supported automotive travel, the method comprising:
    configuring, in an application executing using a processor in a vehicle, an integration with a home automation system to identify an objective of a trip from the home automation system;
    detecting that an event in the vehicle is outside of acceptable bounds for that event;
    establishing a cognitive state of a person operating the vehicle, the establishing using at least one of (i) information from a biometric sensor, (ii) an input from a data processing system accessible in the vehicle, and (iii) an input from the person operating the vehicle;
    determining whether the event being outside of acceptable bounds is a result of the cognitive state of the person operating the vehicle;
    generating, responsive to the event comprising forgetting the objective by the person as the result of the cognitive state of the person, an indication of the cognitive state of the person being below a threshold level of cognitive abilities; and
    performing, using a processor, an action corresponding to the cognitive state, wherein the action causes the vehicle to operate with improved safety.

2. The method of claim 1, further comprising:
    selecting the action from a plurality of actions;
    determining whether the action has to be performed by another system; and
    sending, responsive to the action not having to be performed by another system, a command to a data processing system in the vehicle to change an operation of the vehicle whereby the vehicle operates with the improved safety.

3. The method of claim 1, further comprising:
selecting the action from a plurality of actions;
determining whether the action has to be performed by another system; and
sending, responsive to the action having to be performed by another system, a message to a data processing system from the vehicle over a data network to cause a change an operation of the vehicle whereby the vehicle operates with the improved safety.

4. The method of claim 1, wherein the action causes the vehicle to operate with improved safety by directing the vehicle to a second location, wherein the person had planned to travel to a first location prior to the event.

5. The method of claim 1, further comprising:
associating a confidence level with the indication.

6. The method of claim 1, further comprising:
presenting the person with a set of questions and receiving a corresponding set of answers; and
ascertaining the cognitive state responsive to the set of answers exceeding a threshold.

7. The method of claim 1, further comprising:
rejecting the event, responsive to the event not resulting from the cognitive state of the person.

8. The method of claim 1, further comprising:
validating, responsive to the event being a result of the cognitive state of the person, the cognitive state, wherein the validating distinguishes between a plurality of cognitive states that can cause the event, the cognitive state being one of the plurality of cognitive states.

9. The method of claim 1, further comprising:
receiving a set of inputs, and
detecting the event based on the values of inputs in the set of inputs.

10. The method of claim 9, wherein a first input in the set of inputs comprises a biometric measurement, wherein a second input in the set of inputs comprises a value provided by a data processing system installed in the vehicle.

11. The method of claim 9, wherein a third input in the set of inputs comprises an input provided by the person.

12. A computer usable program product comprising a computer usable storage device including computer usable code for cognitive state supported automotive travel, the computer usable code comprising:
computer usable code for configuring, in an application executing using a processor in a vehicle, an integration with a home automation system to identify an objective of a trip from the home automation system;
computer usable code for detecting that an event in the vehicle is outside of acceptable bounds for that event;
computer usable code for establishing a cognitive state of a person operating the vehicle, the computer usable code for establishing using at least one of (i) information from a biometric sensor, (ii) an input from a data processing system accessible in the vehicle, and (iii) an input from the person operating the vehicle;
computer usable code for determining whether the event being outside of acceptable bounds is a result of the cognitive state of the person operating the vehicle;
computer usable code for generating, responsive to the event comprising forgetting the objective by the person as the result of the cognitive state of the person, an indication of the cognitive state of the person being below a threshold level of cognitive abilities; and
computer usable code for performing, using a processor, an action corresponding to the cognitive state, wherein the action causes the vehicle to operate with improved safety.

13. The computer usable program product of claim 12, further comprising:
computer usable code for selecting the action from a plurality of actions;
computer usable code for determining whether the action has to be performed by another system; and
computer usable code for sending, responsive to the action not having to be performed by another system, a command to a data processing system in the vehicle to change an operation of the vehicle whereby the vehicle operates with the improved safety.

14. The computer usable program product of claim 12, further comprising:
computer usable code for selecting the action from a plurality of actions;
computer usable code for determining whether the action has to be performed by another system; and
computer usable code for sending, responsive to the action having to be performed by another system, a message to a data processing system from the vehicle over a data network to cause a change an operation of the vehicle whereby the vehicle operates with the improved safety.

15. The computer usable program product of claim 12, further comprising:
computer usable code for associating a confidence level with the indication.

16. The computer usable program product of claim 12, further comprising:
computer usable code for presenting the person with a set of questions and receiving a corresponding set of answers; and
computer usable code for ascertaining the cognitive state responsive to the set of answers exceeding a threshold.

17. The computer usable program product of claim 12, wherein the computer usable code is stored in a computer readable storage device in a data processing system, and wherein the computer usable code is transferred over a network from a remote data processing system.

18. The computer usable program product of claim 12, wherein the computer usable code is stored in a computer readable storage device in a server data processing system, and wherein the computer usable code is downloaded over a network to a remote data processing system for use in a computer readable storage device associated with the remote data processing system.

19. A data processing system for cognitive state supported automotive travel, the data processing system comprising:
a storage device, wherein the storage device stores computer usable program code; and
a processor, wherein the processor executes the computer usable program code, and wherein the computer usable program code comprises:
computer usable code for configuring, in an application executing using a processor in a vehicle, an integration with a home automation system to identify an objective of a trip from the home automation system;
computer usable code for detecting that an event in the vehicle is outside of acceptable bounds for that event;
computer usable code for establishing a cognitive state of a person operating the vehicle, the computer usable code for establishing using at least one of (i) information from a biometric sensor, (ii) an input from a data processing system accessible in the vehicle, and (iii) an input from the person operating the vehicle;
computer usable code for determining whether the event being outside of acceptable bounds is a result of the cognitive state of the person operating the vehicle;

computer usable code for generating, responsive to the event comprising forgetting the objective by the person as the result of the cognitive state of the person, an indication of the cognitive state of the person being below a threshold level of cognitive abilities; and computer usable code for performing, using the processor, an action corresponding to the cognitive state, wherein the action causes the vehicle to operate with improved safety.

20. The method of claim 1, further comprising:

determining, using the integration, whether the person is equipped with a medication prior to operating the vehicle;

assisting, from the application, the person in locating the medication using the home automation system.

* * * * *